US 12,551,188 B2

(12) United States Patent
Coviello et al.

(10) Patent No.: US 12,551,188 B2
(45) Date of Patent: Feb. 17, 2026

(54) MAPPING OF CAVITATION ACTIVITY

(71) Applicant: OXSONICS LIMITED, Oxford (GB)

(72) Inventors: Christian Coviello, Oxford (GB); Constantin Coussios, Oxford (GB); Sean Finn, County Mayo (IE); Edward Jackson, Kenilworth (GB)

(73) Assignee: OXSONICS LIMITED, Oxford (GB)

( * ) Notice: Subject to any disclaimer, the term of this patent is extended or adjusted under 35 U.S.C. 154(b) by 350 days.

(21) Appl. No.: 18/000,969

(22) PCT Filed: Jun. 15, 2021

(86) PCT No.: PCT/GB2021/051492
§ 371 (c)(1),
(2) Date: Dec. 7, 2022

(87) PCT Pub. No.: WO2021/255433
PCT Pub. Date: Dec. 23, 2021

(65) Prior Publication Data
US 2023/0240650 A1    Aug. 3, 2023

(30) Foreign Application Priority Data
Jun. 15, 2020 (GB) ..................................... 2009079

(51) Int. Cl.
A61B 8/00 (2006.01)
A61B 8/08 (2006.01)

(52) U.S. Cl.
CPC .......... *A61B 8/4254* (2013.01); *A61B 8/4477* (2013.01); *A61B 8/4488* (2013.01); *A61B 8/5238* (2013.01); *A61B 8/54* (2013.01)

(58) Field of Classification Search
CPC ... A61B 8/4254; A61B 8/4477; A61B 8/4488; A61B 8/5238; A61B 8/54; A61N 7/02; A61N 2007/0052
See application file for complete search history.

(56) References Cited

U.S. PATENT DOCUMENTS

| 6,425,867 | B1 | 7/2002 | Vaezy et al. |
| 2011/0054315 | A1 | 3/2011 | Roberts et al. |

(Continued)

FOREIGN PATENT DOCUMENTS

| CN | 102580260 A | 7/2012 |
| CN | 103285531 A | 9/2013 |

(Continued)

OTHER PUBLICATIONS

United Kingdom Search Report dated Dec. 10, 2020.
(Continued)

*Primary Examiner* — Amal Aly Farag
(74) *Attorney, Agent, or Firm* — William J. Clemens; Shumaker, Loop & Kendrick, LLP

(57) ABSTRACT

An apparatus for imaging cavitation in a subject volume includes a plurality of transducer elements and a control means. The control means controls a first transducer element to generate ultrasound having a focal region, receive passive detection signals from a first group of the transducer elements and generate from the passive detection signals a cavitation image of cavitation in the focal region. The control means controls a second transducer elements to generate reflective imaging ultrasound, receive reflective imaging detection signals from a second group of the transducer elements and generate from the reflective imaging detection signals a reflective image. The reflective image is registered with a 3D image of the subject volume to obtain a transformation between a coordinate system of the first group and a coordinate system of the 3D image. The transformation is applied to the cavitation image to align it with the 3D image.

9 Claims, 5 Drawing Sheets

(56) References Cited

U.S. PATENT DOCUMENTS

| | | |
|---|---|---|
| 2013/0225994 A1 | 8/2013 | Hsu et al. |
| 2016/0151618 A1 | 6/2016 | Powers et al. |
| 2016/0339273 A1* | 11/2016 | Al Mayiah ............ A61N 7/02 |
| 2017/0103533 A1 | 4/2017 | Brokman et al. |
| 2018/0132723 A1 | 5/2018 | O'Reilly et al. |
| 2019/0366126 A1 | 12/2019 | Pahk et al. |

FOREIGN PATENT DOCUMENTS

| | | |
|---|---|---|
| CN | 103596623 A | 2/2014 |
| CN | 104887266 A | 4/2017 |
| CN | 109259822 A | 1/2019 |
| CN | 110035796 A | 7/2019 |
| CN | 111093520 A | 5/2020 |
| CN | 111134719 A | 5/2020 |
| GB | 2515134 | 12/2014 |
| JP | 2009500110 A | 1/2009 |
| JP | 2013244167 A | 12/2013 |
| JP | 2018513726 A | 5/2018 |
| JP | 2018534038 A | 11/2018 |
| JP | 2019502445 A | 1/2019 |
| WO | 2010052494 A1 | 5/2010 |
| WO | 2012042423 A1 | 4/2012 |
| WO | 2013046131 A1 | 4/2013 |
| WO | 2014160964 A1 | 10/2014 |
| WO | 2014172265 A1 | 10/2014 |
| WO | 2016170427 A1 | 10/2016 |
| WO | 2017062673 A1 | 4/2017 |
| WO | 2018069684 A1 | 4/2018 |

OTHER PUBLICATIONS

United Kingdom Search Report dated Aug. 11, 2021.

Christopher N. Acconcia, et al., Megahertz rate, volumetric imaging of bubble clouds in sonothrombolysis using a sparse hemispherical receiver array, Phys. Med. Biol.,2017, pp. L31-L40, No. 62, Institute of Physics and Engineering in Medicine, IOP Publishing, UK.

Costas D. Arvanitis and Nathan Mcdannold, Integrated Ultrasound and Magnetic Resonance Imaging for Simultaneous Temperature and Cavitation Monitoring During Focused Ultrasound Therapies, Medical Physics, Nov. 2013, pp. 1-14, vol. 40, No. 11, American Association of Physicists in Medicine, Alexandria, VA, US.

* cited by examiner

MAPPING OF CAVITATION ACTIVITY

FIELD OF THE INVENTION

The present invention relates to therapeutic ultrasound systems and in particular to the mapping and monitoring of treatments using acoustic (ultrasound-induced) cavitation.

BACKGROUND TO THE INVENTION

The use of focused ultrasound (FUS) for cancer therapy has several major advantages over other, more established treatment modalities: it is cheap, non-invasive, and has minimal side-effects. However, widespread acceptance of FUS is hindered by the lack of a reliable real-time monitoring system.

Above a certain pressure threshold, high-amplitude acoustic waves propagating through tissue can spontaneously nucleate and excite small, nano- or micron-sized bubbles, a phenomenon known as acoustic cavitation. With the addition or infusion of exogenous bubbles acting as cavitation nuclei, be they shelled bubbles or stabilized bubbles on the surface of solid particles [Stride, E. P., & Coussios, C. C. (2010). *Cavitation and contrast: The use of bubbles in ultrasound imaging and therapy. Proceedings of the Institution of Mechanical Engineers, Part H: Journal of Engineering in Medicine,* 224(2), 171-191], lower amplitude acoustic waves can cause acoustic cavitation in the nuclei, enabling a lower pressure threshold.

Depending on the desired application, the cavitating bubbles can be used to cause desired bioeffects. In the case of tissue ablation, these bioeffects could cause thermal necrosis or mechanical fractionation of tissue. In drug delivery, this could be cavitation-induced micro-streaming or micro-pumping, permeation of vasculature, and proration of cells, which all aid or enhance the transport of unmodified drugs across tissue membranes or alternatively directly act to rupture drug-loaded vehicles for targeted drug delivery.

The bubbles can also re-emit part of the incident ultrasound over a range of frequencies that are different to the FUS excitation frequency, which is useful for two reasons. Firstly, the broadband acoustic emissions that are associated with this acoustic cavitation can serve as an indicator or surrogate marker of treatment efficacy for ablation and drug delivery. Secondly, the emissions that have a higher frequency content than the original FUS source, and will be absorbed more readily by surrounding tissue, enhancing heat deposition in thermal ablation [Coussios C C, Farny C H, Haar G T, Roy R A. "Role of acoustic cavitation in the delivery and monitoring of cancer treatment by high-intensity focused ultrasound (HIFU)", International Journal of Hyperthermia vol. 23, pp 105-120, 2007]. While the field of FUS broadly covers all biomedical applications and system configurations involved with focusing ultrasound, the more specific term high-intensity focused ultrasound (HIFU) is generally used when the amplitude or intensity of incident ultrasound is higher than achievable from a diagnostic ultrasound imaging system.

WO20100052494 discloses a system for imaging a region of acoustic cavitation during FUS treatment. However, while that system can effectively image the cavitation in real time, it does not describe any way of determining the location of the cavitation in the frame of reference of the patient, i.e. relative to the anatomy of the patient. Since cavitation activity is a predictor of efficacy in drug delivery, and safety in the case of mechanical or thermal ablation, the ability to image and visualize cavitation in 3D has potential benefits in improved treatment decisions and post-treatment assessment, especially as the 3D volumetric images of the patient, such as X-ray or MR images, are generally higher resolution and higher contrast than ultrasound imaging, allowing the cavitation to be shown in high quality 3D images.

SUMMARY OF INVENTION

The present invention provides apparatus for imaging cavitation in an imaged volume of a subject. The apparatus comprises a plurality of transducer elements, and control means. The control means is arranged to: control at least a first one of the transducer elements to generate ultrasound having a focal region, which may be therapeutic ultrasound; receive passive detection signals from a first group of the transducer elements and generate from the passive detection signals a cavitation image of cavitation in the focal region; control at least a second one of the transducer elements to generate reflective imaging ultrasound; receive reflective imaging detection signals from a second group of the transducer elements and generate from the reflective imaging detection signals a reflective image; register the reflective image with a 3D image of the subject volume to obtain a transformation between a coordinate system of the first group of transducer elements and a coordinate system of the 3D image; and apply the transformation to the cavitation image to align the cavitation image with the 3D image.

The reflective imaging may be pulse echo imaging, for example B-mode ultrasound imaging, contrast-enhanced ultrasound, pulse inversion ultrasound, or harmonic ultrasound imaging.

The at least a first one of the transducer elements, arranged to generate focused ultrasound, may be a geometrically focused transducer, for example with a fixed focus, a geometrically focused transducer array having a quiescent focus that can be electronically moved or steered, or linear or planar transducer array, which may not be completely straight or flat, in which the focusing is however all or substantially all electronic. The focusing may therefore be provided geometrically, or electronically, or by a combination of the two.

The first one of the transducer elements may be one of the first group of transducer elements, or one of the second group of transducer elements, or not one of either group. Similarly the second one of the transducer elements may be one of the first group of transducer elements, or one of the second group of transducer elements, or not one of either group.

The first group of transducer elements may be in a fixed position relative to the second group of transducer elements.

The system may further comprise a probe, which may be handheld or robotically manipulated. The first group of the transducer elements and the second group of the transducer elements may comprise a part of the probe, for example being mounted within or on the probe.

The first group and/or the second group of the transducer elements may be a linear, in particular straight or convex linear, array of transducer elements. The first group and/or the second group of the transducer elements may be a planar, in particular flat or convex planar array of transducer elements. Concave linear or concave planar transducer arrays, or other configurations such as annular arrays, may also be used.

At least one of the first group of transducer elements may also be one of the second group of transducer elements. Indeed the first group of transducer elements may also be, i.e. comprise the same transducer elements as, the second group of transducer elements.

The transformation may be obtained directly from the registration process, for example if the relative positions of the first and second groups of transducers are known or if the first and second groups of transducers are the same. Alternatively, if the first and second groups of transducers are moveable relative to each other, the transformation may be obtained indirectly from the registration process, based also on measurements of the relative positions of the two groups of transducer elements.

The invention further comprises a method of imaging cavitation in an imaged volume of a subject. The method may comprise: generating ultrasound having a focal region; receiving passive detection signals from a first group of transducer elements and generating from the passive detection signals a cavitation image of cavitation in the focal region; generating reflective imaging ultrasound; receiving reflective imaging detection signals from a second group of transducer elements and generating from the reflective imaging detection signals a reflective image;

registering the reflective image with a 3D image of the imaged volume to obtain a transformation between a coordinate system of the first group of transducer elements and a coordinate system of the 3D image; and applying the transformation to the cavitation image to align the cavitation image with the 3D image.

The invention further provides apparatus for imaging cavitation in an imaged volume of a subject, the apparatus comprising a plurality of transducer elements, and control means, wherein the control means is arranged to: control at least a first one of the transducer elements to generate focused ultrasound having a focal region; receive passive detection signals from a first group of the transducer elements and generate from the passive detection signals a cavitation image of cavitation in the focal region; control at least a second one of the transducer elements to generate reflective imaging ultrasound; receive reflective imaging detection signals from a second group of the transducer elements and generate from the reflective imaging detection signals a reflective anatomical image; combine the cavitation image and the reflective anatomical image to generate a 3D image of the cavitation in the imaged volume.

The system may further comprise, in any workable combination, any one or more features of the embodiments of the invention, shown in the accompanying drawings, as will now be described.

DESCRIPTION OF THE PREFERRED EMBODIMENTS

Figure 1:
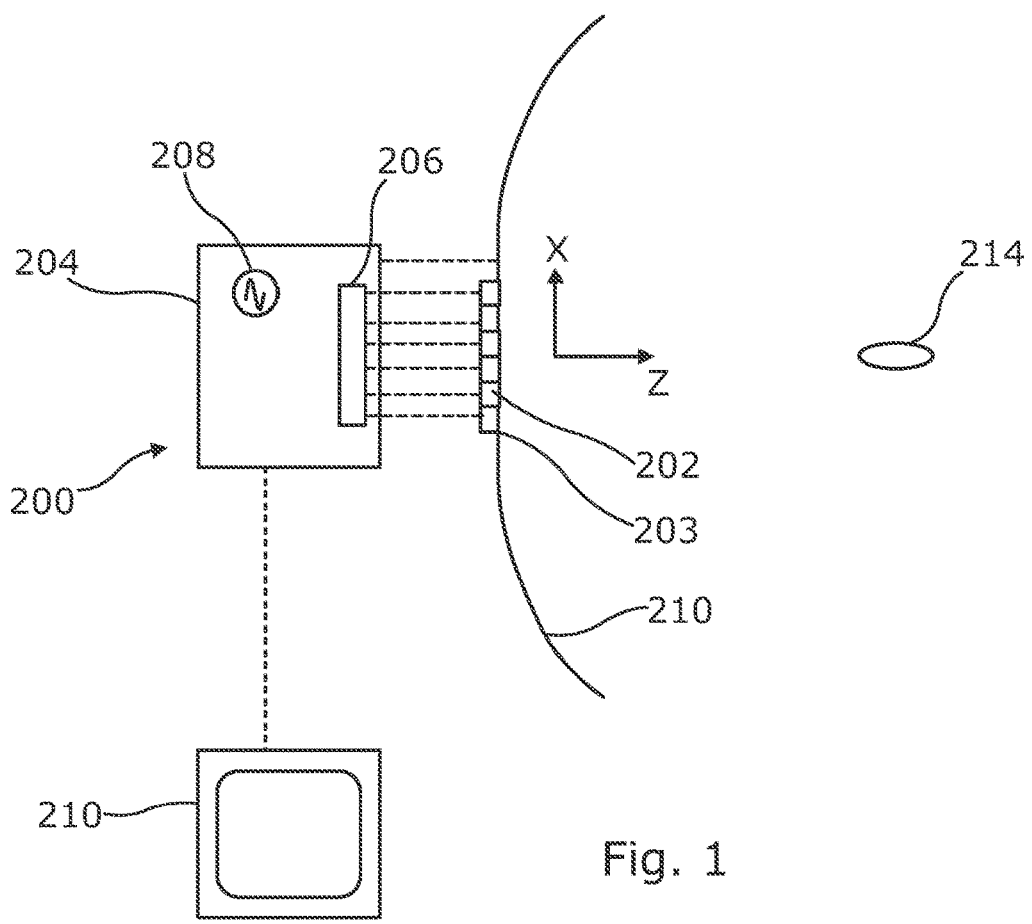
FIG. 1 is a schematic diagram of an ultrasound system according to an embodiment of the invention.
Figure 2:
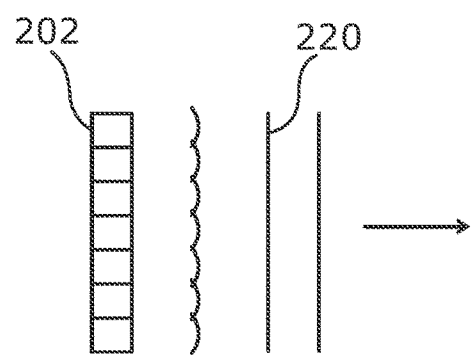
FIG. 2 is a schematic diagram of the system of FIG. 1 transmitting ultrasound waves for anatomical imaging.

Referring to FIG. 1, the ultrasound system 200 may comprise a geometrically focused ultrasound transducer 201, with an array of ultrasound transducer elements 202 positioned in an aperture 203 in the centre of the transducer 201. Each of the transducer elements 202 may be operable to generate ultrasound and also to detect ultrasound. They may therefore be usable in an active mode in which they generate and detect ultrasound to generate reflective (e.g. B-mode) ultrasound images, or in a passive mode in which they only detect ultrasound. The array may be a linear or convex linear array extending primarily in a direction which will be referred to as the x direction as shown in FIG. 2. The direction, perpendicular to the x direction, along the axis of the transducer will be referred to as the z direction. The imaging plane of the array is therefore the x-z plane. The direction perpendicular to both the x and z directions will be referred to as the y direction.

A control unit 204 is arranged to control generation of ultrasound signals by each of the transducer elements 202 and to receive the detection signals from each of the transducer elements 202. The control unit 204 may comprise a pre-amplifier and filter block 206 and an oscillator 208. The control unit 204 is also arranged to control the transducer 201 to control the power and frequency of the ultrasound generated by the transducer 201, for example using a signal from the oscillator 208 to control the frequency of the ultrasound. It will be appreciated that the control unit 204, while being described functionally, can be made up of a single processor, or two or more separate processors performing different functions, for example control and analyzing functions, within the system. The control unit is connected to a display screen 210 on which data derived from the detection signals can be displayed in a suitable format. In this case, the therapeutic transducer 201 has a focus in a focal region 214, in which it will generate the highest intensity ultrasound.

While the arrangement of FIG. 1 can be implemented using a variety of components and systems, in one embodiment an ultrasound data acquisition system may be used that allows simultaneous raw radio-frequency (RF) data or in-phase quadrature (I/Q) data-which can be demodulated to RF-across a wide ultrasound bandwidth (e.g. 1-15 MHz) from multiple individual elements 202. If the array is to be used in the passive mode, pulse transmission may be switched off so that the array acts on receive only. In some modes, one group of transducer elements 202 is used in the active mode and another group in the passive mode so that active and passive detection can be used simultaneously. To make the system clinically applicable, a therapeutic ultrasound transducer transducer 201 may be used, which has a central aperture 203 for a linear (straight or convex) detector array 202.

The theory behind the operation of the passive acoustic mapping will now be briefly described, although it is described in more detail in WO2010/052494. Active detection, which includes pulse-echo (e.g. B-mode) imaging, requires an ultrasound generator which is arranged to generate ultrasound, typically in a pulse, and a detector, or receiver, which detects reflected ultrasound or re-emitted ultrasound from a cavitation region, and a processing system which uses the time interval between the generation of the ultrasound and the detection of ultrasound in determining the position of detected cavitation. In contrast, in passive localization and mapping, there is no direct information about the propagation time from a source to a receiver. Instead, cross-correlation of detection signals from a pair of receivers can provide an estimate of the differential time of arrival (DTOA), i.e. the difference in arrival time at the receivers of a signal from a source. This enables the difference in distance between the receivers and the source to be estimated. By using a set of cross-correlation pairs, single source localization and extended source mapping is possible. It will be appreciated from this that a single detector can be operated in both active and passive detection, depending on the processing which is performed on the sensor signals. A further explanation of passive localization and imaging follows.

Typically, where there is an extended region of cavitation, spatial maps of cavitation are necessary. The approach typically taken is one of passive beamforming, and one method is described in Coviello, et al. "Passive acoustic mapping utilizing optimal beamforming in ultrasound therapy monitoring", J. Acoust. Soc. Am. 137 (5), May 2015. If a regular grid of pixels is defined in the imaging plane in which to create the spatial maps, each pixel is defined by a center defined by a 3D coordinate $x=[x, y, z]^T$, and a spacing in each dimension given by $[dx, dy, dz]^T$. Define the distance from pixel position x to receiver j at position $x_j$ by $$d_j(x) = \sqrt{(x-x_j)^2+(y-y_j)^2+(z-z_j)^2}.$$

For each pixel, the data at the receiver is pre-steered with time delays applied to each receiver signal to compensate for the propagation time from the pixel being imaged to the receiver. If we assume there are N total receivers, the strength of the sound field at the pixel position is then $$q(x, t) = \frac{4\pi}{N\alpha} \sum_{j=1}^{N} d_j(x) s_j(t + \tau_j(x))$$

Where $s_j(t)$ is the recorded signal at receiver (sensor) j, $\tau_j(x)=d_j(x)/c$ the propagation time from location x to sensor j, a is the piezoelectric coefficient that is a characteristic of each receiver (sensor) element, and c is the speed of propagation. The multiplication by $d_j(x)$ above compensates for the reduction in source signal strength from spherical spreading of the wavefronts. An image of source energy at a pixel is generated by integrating the square of the source strength over a collection period of length T, assuming uniform detector weighting as $$\Psi(x) = \frac{1}{4\pi\rho_o c} \int_{t_0}^{t_0+T} q(x, t)^2 dt$$

where $\rho_o$ is the density of the medium and c is the speed of propagation. This energy is then computed for each pixel position desired in the image.

Figure 3:
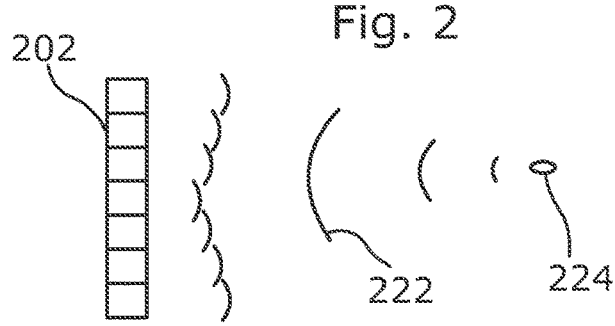
FIG. 3 is a schematic diagram of the system of FIG. 1 transmitting ultrasound waves for therapeutic treatment.

Referring to FIGS. 2 and 3, the control unit 204 may be arranged to control the transducer elements 202 as a phased array. For example the control unit maybe arranged to generate a transmit signal for each of the transducer elements 202 to control the frequency and timing, i.e. relative phase, of the vibration, and hence the ultrasound, that each transducer element produces. Typically the frequency of vibration of each of the transducer elements is controlled so as to be the same, and the phase, or timing, of each of the elements is varied so as to steer the ultrasound that is generated by the array as a whole. The transducer elements may be arranged to vibrate in phase with each other, which produces ultrasound having straight parallel wave fronts 220 all travelling in the same direction, as shown in FIG. 2. This is suitable for anatomical ultrasound (B-mode or other reflective) imaging. If the phase of the vibrations of the elements 202 is shifted so that those at the outer ends of the array are in phase with each other, and the delay increase towards the centre of the array, as shown in FIG. 3, then this generates ultrasound with curved wave fronts 222 that converge at a focal region 224.

It will be appreciated that rather than having a separate transducer 201 for the focused ultrasound transmission, the array of ultrasound elements 204 may be used to generate ultrasound for both anatomical imaging and therapeutic FUS by switching rapidly between the two different phase configurations. Furthermore, since both anatomical ultrasound imaging and the passive acoustic mapping described above require detection of ultrasound reflected or generated by the tissue being imaged, this detection may also be done in some embodiments of the invention by the same transducer elements 202 that are used to transmit ultrasound. However that requires further time division and in many cases it is preferable to have a separate transducer array for detection, or receiving, of ultrasound. Therefore, in the following description where reference is made to transmit and receive arrays these will typically be separate arrays, but may alternatively be the same array.

Figure 4:
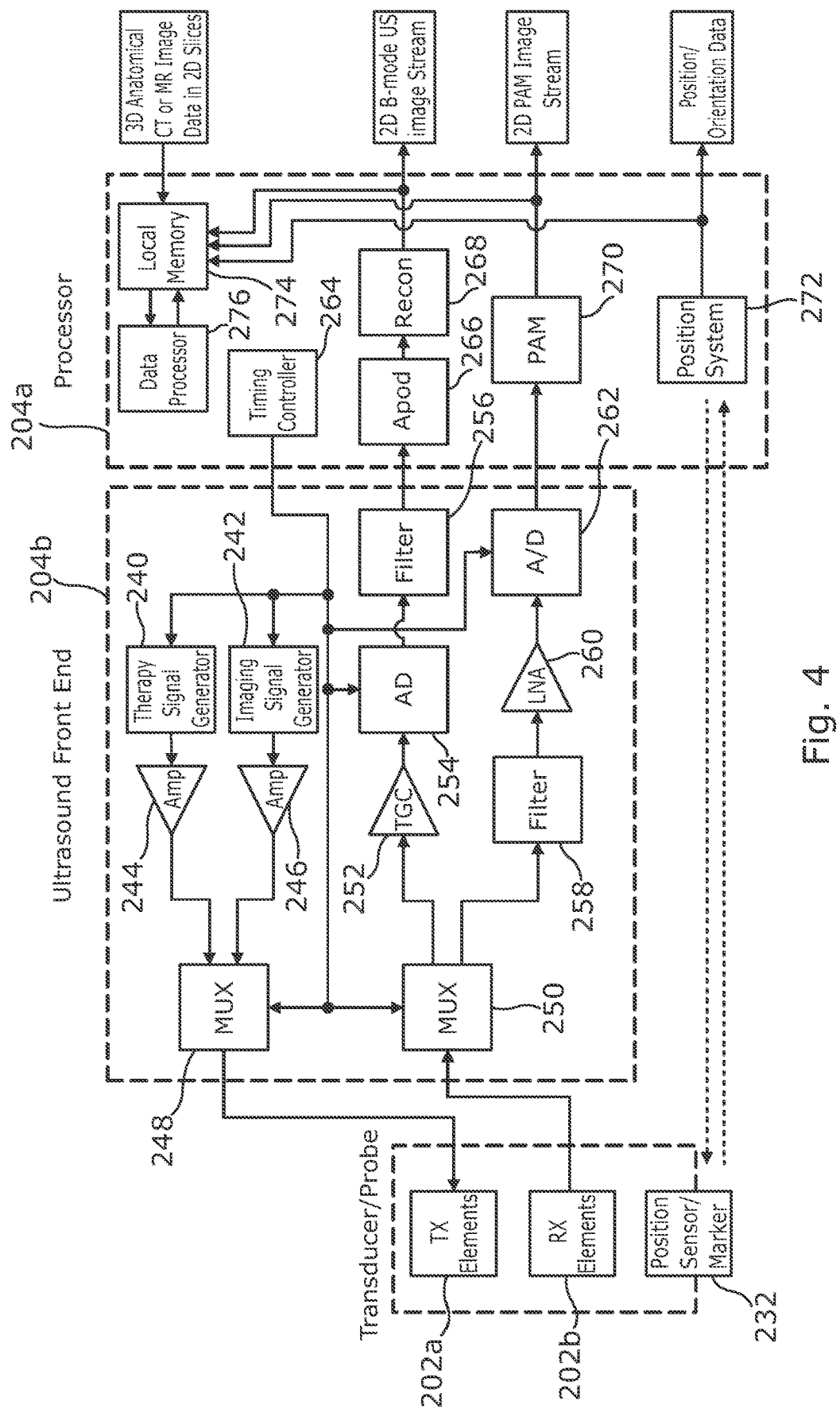
FIG. 4 is schematic functional block diagram of the ultrasound system of FIG. 1.

Referring to FIG. 4, in a practical implementation of the system of FIG. 1, the transducer elements 202 are separated into two groups, each group of transducer elements being arranged in an array, a transmit array 202a and a receive array 202b and these are both mounted in a probe 230 which also comprises a position sensor 232. Each of these arrays 202a, 202b may be a linear array as described above. The separate geometrically-FUS transducer 201 of FIG. 1 is therefore omitted. In a modification to this arrangement, the transducer elements are provided in a therapeutic group and an imaging group. The therapeutic group of transducer elements may then be arranged to generate focused ultrasound, while the imaging group of transducer elements are arranged to both transmit and receive the reflective imaging ultrasound, as well as to receive the passive cavitation mapping signals. The imaging group may be arranged to transmit flat planar ultrasound waves, or focused ultrasound, for example with sub-groups of the transducer elements controlled to provide different respective focal points at a common focal depth, to give a good quality image at that depth.

The position sensor can be suitable for any of a number of known position and orientation sensing systems. For example it may be the sensor of an electromagnetic motion tracking system, it may comprise one or more markers enabling the position of the probe to be tracked with a stereoscopic optical camera, and infra-red camera, or a laser tracker.

The control unit 204 comprises a main processor 204a and an ultrasound front end processor 204b. The ultrasound front end 204b comprises a transmit side and a receive side. On the transmit side it comprises generators arranged to generate each of the ultrasound signals that are to be transmitted by the transmit array 202a. For example these may comprise a therapy signal generator 240 and an imaging signal generator 242. Each of these signal generators 240, 242 is arranged to output transmit signals that are input to the individual transducer elements of the transmit array 202a so that they transmit an ultrasound signal in the required form for therapeutic FUS and for B-mode ultrasound imaging respectively, for example as shown in FIGS. 2 and 3. The ultrasound front end 204b further comprises two amplifiers 244, 246 each arranged to amplify the transmit signals from a respective one of the signal generators 240, 242, and a multiplexer 248 which is arranged to receive both of the amplified transmit signals and send each of them to the correct transmit array 202a at the appropriate time in a time divisional multiplexed manner. The timing controller 264 sends out trigger or synchronization signals to arrange the timing of the signal generators and multiplexers as will be described in more detail below.

The receive side of the ultrasound front end 204b comprises a multiplexer 250 arranged to receive all of the detection signals from the receive array 202b and separate out the anatomical ultrasound imaging signals (e.g. B-mode) from the passive acoustic mapping signals onto an anatomical ultrasound imaging channel and a PAM channel. This separation is done on the basis of timing, as the received anatomical imaging signals are reflections of the transmitted anatomical imaging signals, and the received PAM signals are generated by cavitation which is caused by the transmitted FUS signals. The anatomical imaging signals are time gain compensated by a TGC module 252, digitized by an ADC 254 and filtered by a digital filter 256. The PAM signals are filtered by an analogue filter 258 to isolate the high frequency broadband signals used for PAM, and amplified by a low noise amplifier 260 before being digitized by an ADC 262.

The main processor 204a comprises a timing controller 264 which is arranged to provide timing inputs to the ultrasound signal generators 240, 242, the multiplexers 248, 250 and the ADCs 254, 262. The timing inputs to the ultrasound signal generators 240, 242 are arranged to trigger the generation of the therapeutic FUS signal and the anatomical ultrasound imaging signal in an alternating manner, each for a respective series of brief time periods. The multiplexer 248 uses the timing signal it receives from the timing controller 264 to multiplex the two types of ultrasound generation signal onto the control input to the transmitter array 202a, so that the transmitter array 202a will generate alternating pulses of therapeutic FUS and focused or unfocused imaging ultrasound. The receive multiplexer 250 is controlled by the timing controller 264 to switch the signals from the receive array 202b between the B-mode channel and the PAM channel based on the time of transmission of the two different types of ultrasound and the known or assumed delay between transmission and reception of the relevant ultrasound signals. The timing controller 264 also provides timing inputs to the ADCs 254 262 to control the sampling rate of the analogue signals by the ADCs.

Figure 5:
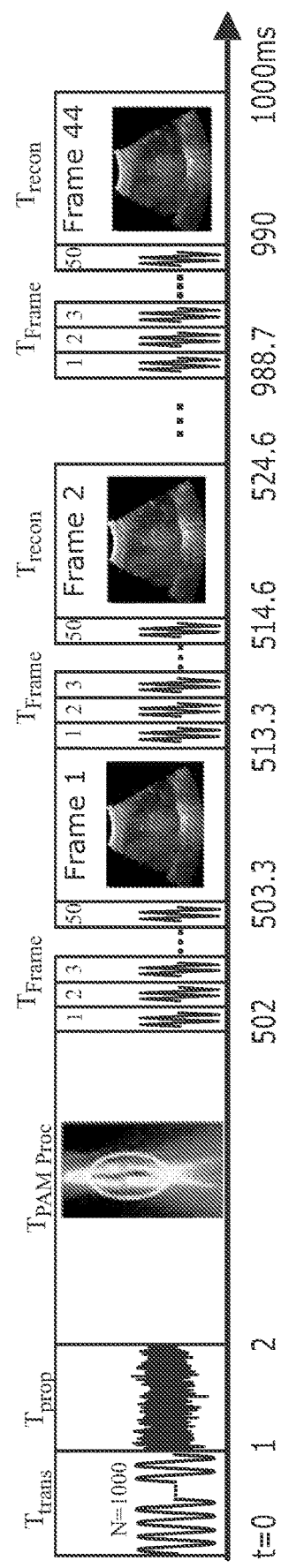
FIG. 5 is a timing diagram showing operation of a system according to an embodiment of the invention.

Referring to FIG. 5, as an example of the timing of the different transmitted and received ultrasound signals it may desired to transmit a therapeutic FUS pulse of frequency 1 MHz and length 1000 cycles every 1 s. It may also be desired to maintain a sufficient imaging frame rate (>30 frames/s) up to a depth d=20 cm but also transmit several pulse-echo imaging pulses to make up a single image frame to improve imaging signal-to-noise ratio (assuming 50 pulses/frame). Given the 1 s therapy pulse rate, it is then necessary to fit all pulse transmit time, propagation time, and processing time into that 1 s.

EXAMPLE

Therapy ultrasound frequency=1 MHz
Therapy pulse PRF=1 Hz or 1 s period
Number of cycles per therapy pulse N=1000 cycles
Therapy transmit time per pulse $T_{trans}$=1 ms.
Therapy transmit time plus propagation time $T_{trans+prop}$~2 ms
Add in the passive acoustic mapping (PAM) processing time after each pulse $T_{trans+prop+PAM\ proc}$=502 ms
So the time to transmit one therapy pulse, detect US generated by cavitation, and process into PAM takes half of the 1 s period.
Remaining time=498 ms.
If the system is synchronous, this remaining time is what can be used for B-mode imaging. If the system is asynchronous, B-mode imaging pulse transmits can occur immediately after the $T_{trans+prop}$. This example only covers the synchronous case for simplicity.
Assume speed of propagation c=1500 m/s, and that it takes 10 ms to reconstruct all the imaging pulses into an image, and
Imaging US frequency=5 MHz
Number of cycles in each imaging pulse N=2 cycles
Imaging transmit time $T_{trans}$=0.4 µs
Add in propagation time $T_{trans+prop}$=26.4 µs
For 50 pulses per image frame, $T_{frame}$=50*26.4 µs=1.3 ms
Add in the image frame reconstruction and processing time:
$T_{frame}$+$T_{recon}$=1.3 ms+10 ms=11.3 ms
Frame rate=498 ms/11.3 ms=44 frames/sThe main processor 204a further comprises an apodization unit 266 and an image reconstruction unit 268 which are arranged to receive the filtered digital signals from the B-mode channel of the ultrasound front end 204b and generate from them an anatomical ultrasound image, for example in the form of a 2D B-mode ultrasound imaging stream which may comprise a sequence of time stamped 2D image frames. The main processor 204a further comprises a PAM imaging unit 270 which is arranged to receive the digital signals from the PAM channel of the ultrasound front end 204b and generate from them a PAM image, for example in the form of a 2D PAM imaging stream which may also comprise a sequence of time stamped PAM image frames.

The main processor 204a further comprises a positioning unit 272 which is arranged to receive position and orientation data (such as translation and rotation) from the position sensor 232 on the probe 230 and to time stamp that data and output a position/orientation data stream so that the position and orientation of the probe associate with each form of the image streams can be determined. This allows the probe to be moved to scan an imaged volume and the 2D images generated from the probe's receive array to be located in a 3D coordinate system.

The main processor 204a further comprises a local memory 274 and a data processor 276. The local memory 274 is arranged to receive and store the image from the anatomical and PAM imaging channels and the position/orientation data stream from the positioning unit 272. It is also arranged to receive and store 3D anatomical image data obtained from a previous scan of the patient, for example in the form of a set of 2D image slices obtained by CT or MRI scanning, which may be in DICOM format for example. The data processor 276 is arranged to process the data stored in the local memory so as to generate a combined image or image stream in which the PAM image of the FUS-induced cavitation is superimposed on an a 3D anatomical image of the patient, which may be the pre-scanned 3D image, or may be a 3D ultrasound image generated from the compounded 2D B-mode ultrasound image slices. The processing method by which the combined image may be obtained will now be described.

Figure 6:
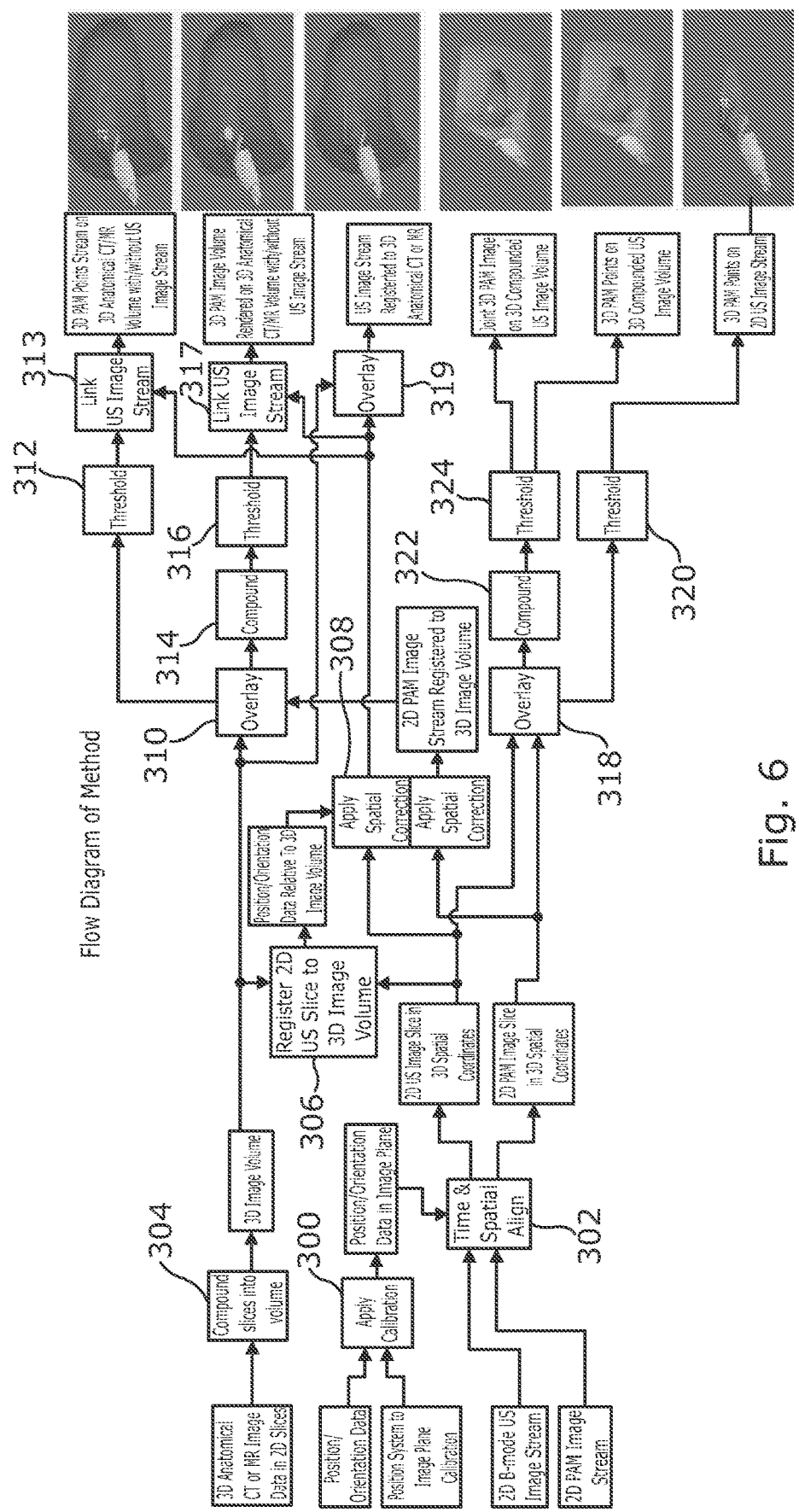
FIG. 6; is a flow diagram showing an imaging method performed on the system of FIG. 1.

Referring to FIG. 6, the local memory 274 is arranged also to store position system calibration data which defines the position and orientation of the 2D ultrasound imaging plane, of B-mode images generated from the receiver array signals, relative to the position and orientation of the probe as determined by the position sensor 232. This calibration data may be obtained by imaging a known 3D structure in a known position and orientation relative to the probe 230, and registering the 2D ultrasound images obtained with image data of the known structure to determine the position and orientation of the imaging plane relative to the probe. The processor 276 is arranged at step 300 to apply the calibration defined by the calibration data to the position/orientation data stream to generate image position/orientation data defining the position and orientation of the imaging plane for each image frame in a 3D coordinate system, which may be referred to as a probe coordinate system.

Since the PAM images are generated from the same receive array 202b of transducer elements as the 2D anatomical imaging, the imaging planes of the 2D PAM images and the 2D anatomical images can be assumed to be coincident and the positions in the imaging plane can be determined using the same coordinate system for the two imaging methods. Therefore the relative positions of imaged features in the PAM image and the 2D anatomical images is known, and the position of each type of image defined and recorded in the common probe coordinate system. However a further calibration step may be included in which a structure in which cavitation will occur in known position is imaged with both PAM and 2D reflective (e.g. 2D B-mode) ultrasound imaging and the relative positions of the imaging planes of the two imaging methods, and the positions within those planes, is calibrated.

At step 302 the frames of the 2D B-mode image stream and the frames of the 2D PAM image stream are time aligned with each other. This is generally necessary because the frame rates of the two different imaging methods may be different, and because, due to the requirement to multiplex the imaging methods, the times of individual frames will not be the same. This time alignment together with the positional calibration, results in the position and orientation and the time of each frame in both image streams being defined in the same 4D coordinate system, i.e. the 3D spatial coordinate system and time.

At step 304 the 2D slices of the 3D anatomical data are compounded into a 3D image data set for the full 3D volume of the patient's anatomy. Of course the anatomical data may be stored in a 3D format already in which case this compounding step is not necessary. Then at step 306 each of the 2D ultrasound anatomical image slices is registered with the 3D (typically high contrast) anatomical image. Various methods of registering images are known, for example as described in Wein, et al "Automatic CT-ultrasound registration for diagnostic imaging and image-guided intervention," Medical Image Analysis, Vol. 12, pp. 577-585, 2008. This determines a spatial correction or transformation that can be applied to the coordinates of the 2D anatomical ultrasound images (and the PAM images) to correctly locate them in the coordinate system of the 3D anatomical image. At step 308 that spatial correction or transformation is applied to the coordinates of the PAM images, so that their position and orientation in the coordinate system of the 3D anatomical image is determined. The result of this image registration and coordinate transformation is therefore a 2D anatomical ultrasound image stream defined in the coordinate system of the 3D anatomical image and a 2D PAM image stream defined in the coordinate system of the 3D anatomical image. This allows the 3D high contrast anatomical image and the 2D anatomical ultrasound images and the PAM images to be overlayed in various ways.

For example at step 310 the 2D PAM images may be overlaid onto the 3D high contrast anatomical image, and then at step 312 the image may be thresholded to identify key loci, or reference points, of activity, such as points of maximum, or minimum, or median cavitation. This provides an image of cavitation reference points, located in the 3D high contrast anatomical image. Optionally this image may be combined with the 2D US image stream at step 313 to produce an image comprising the 3D PAM reference points superimposed on the 3D anatomical image, optionally also combined with the 2D reflective US image as well.

Alternatively at step 314, after the overlay step 310, the 2D PAM images may be compounded to generate a 3D PAM image of the cavitation activity located in the 3D anatomical image. That compounded 3D image may then also be thresholded at step 316 so that only pixels having a threshold level of cavitation activity or above are shown in the PAM component of the combined image. Optionally this image may be combined with the 2D US image stream at step 317 to produce an image comprising the 3D PAM image superimposed on the 3D anatomical image, optionally also combined with the 2D reflective In addition, the 2D ultrasound images, registered with the 3D anatomical image at step 306 may be overlaid at step 319 with that 3D image and displayed as a combined 2D ultrasound and CT or MRI image.

In a further alternative embodiment, for example where a 3D high contrast anatomical image of the patient is not available, the time aligned and spatially aligned images from the 2D PAM image stream may be overlaid onto the 2D ultrasound image stream at step 318, thresholded at step 320, and displayed as a combined image showing the PAM key loci in 3D superimposed on a 2D ultrasound image but displayed only when co-located in the 2D US image plane.

Alternatively, the overlaid 2D images obtained at step 318 may be compounded at step 322 to generate a 3D image of the cavitation as imaged in the PAM images superimposed on a 3D anatomical ultrasound image. The PAM image may be a full 3D image, or just the reference points described above.

In theory, all three image types may be combined to generate an enhanced 3D anatomical image, obtained from the 3D anatomical image and the multiple anatomical ultrasound 2D images compounded to form a 3D reflective ultrasound image, with the 3D PAM images superimposed upon it. However such images are likely to be difficult to interpret.

It will of course be appreciated that various modifications to the embodiments shown in FIGS. 1 to 5 may be made. For example, while the transmit and receive arrays 202a, 202b are both 1D linear or convex arrays, either or both of them may be 2D planar arrays. This means that, if the full 2D arrays are used for transmission and reception in the anatomical ultrasound imaging, the anatomical ultrasound images, or each image frame of the ultrasound image stream, may be a three-dimensional anatomical image. It also means that, if the full 2D reception array is used for the PAM imaging, the PAM image may be a full 3D image of the cavitation activity generated by the FUS. It also means that the full 2D transmission array may be used to generate the FUS.

Figure 7:
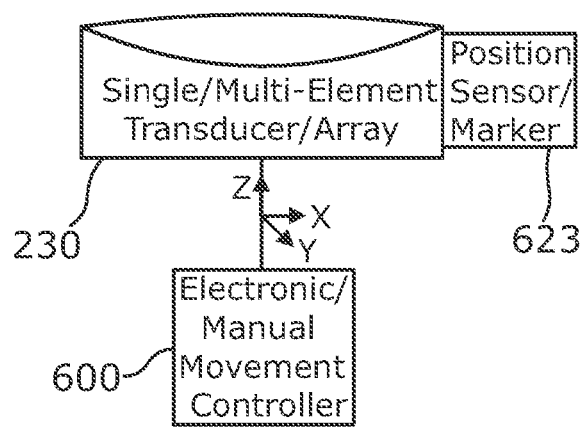
FIG. 7; is a schematic diagram of an ultrasound system according to a further embodiment of the invention.
Figure 8:
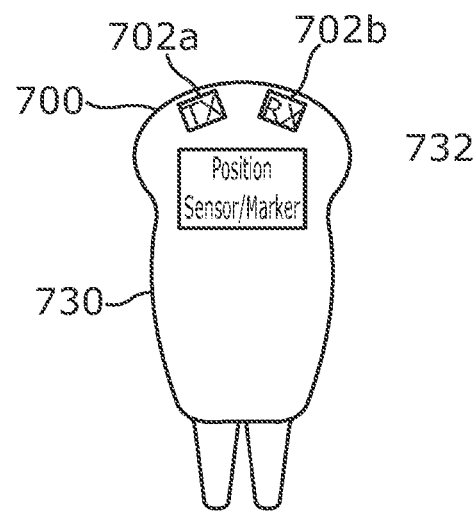
FIG. 8 is a schematic diagram of an external ultrasound probe according to a further embodiment of the invention.
Figure 9:
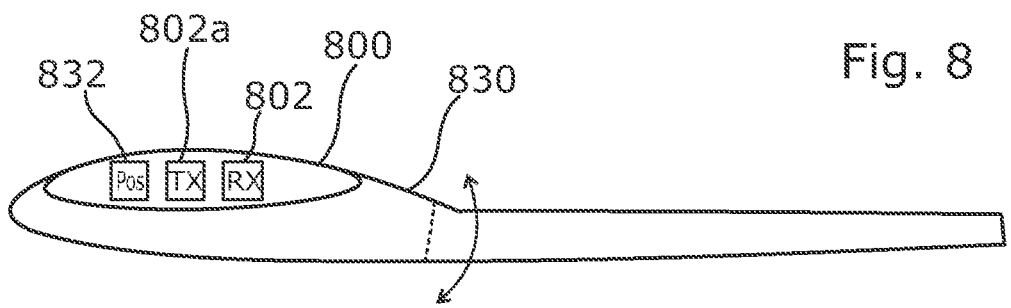
FIG. 9 is a schematic diagram of an internal ultrasound probe according to a further embodiment of the invention.

Referring to FIGS. 7 to 9, the system of FIGS. 2 to 6 may be incorporated in various different probe configurations. For example, referring to FIG. 6, the probe 230 may be connected to an electronically, or manually, controlled movement control system 600, such as a robotic arm or multi-axis movement system, arranged to support the probe and control its movement in six degrees of freedom (three along orthogonal translational directions of movement and three about orthogonal rotational axes) in response to input from an electronic control system or manual inputs. In this case the position and orientation of the probe 230 may be determined from a position sensor 232 mounted on the probe as described above, or may be determined from the operation of the movement control system.

Referring to FIG. 8, the probe may be a hand-held external probe 730 having a contact surface 700 arranged to be placed in contact with the patient's skin, and with the transmit and receive arrays 702a, 702b mounted in or adjacent to the contact surface 700. In this case the position sensor 732 is mounted in the or fixed onto the body of the probe 730 so that all manual movements of the probe can be recorded as described above.

Referring to FIG. 9, the probe may be a hand-held internal or intra-operative probe 830 having a contact surface 800 arranged to be placed in contact internally to the patient, and with the transmit and receive arrays 802a, 802b mounted in or adjacent to the contact surface 800. In this case again the position sensor 832 is mounted in the body of the probe 830 so that all manual movements of the probe can be recorded as described above.

Figure 10:
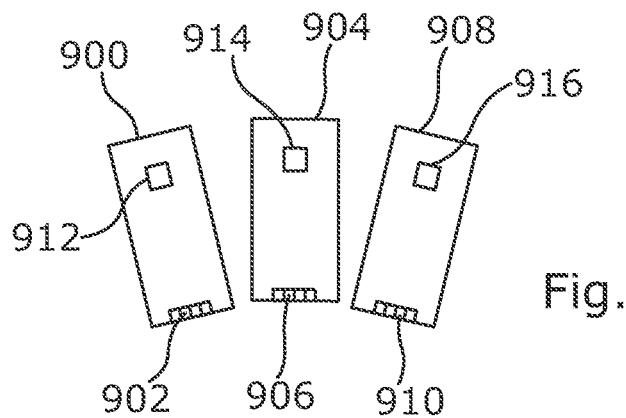
FIG. 10 is a schematic diagram of ultrasound system comprising separate arrays for transmitting and receiving ultrasound waves for ultrasound imaging, transmitting ultrasound waves for therapeutic ultrasound, and receiving passive detection signals for cavitation imaging according to a further embodiment of the invention.

Referring to FIG. 10, rather than all being mounted on a common probe, the system may comprise separate probes each with a different group of the transducer elements supported on it. For example the system may comprise an anatomical imaging probe 900 having an array 902 of transducer elements supported on it. This array 902 may be a linear or convex array and may be arranged to transmit the reflective imaging ultrasound, for example a shown in FIG. 2, and to receive the reflected ultrasound, either using the same group of transducer elements within the array 902, or a different group of transducer elements within the array 902, or using a separate array of transducer elements. The system may comprise a FUS probe 904 having an array 906 of transducer elements arranged to generate therapeutic FUS for example as shown in FIG. 3. The system may further comprise a PAM probe 908 having an array 910 of transducer elements arranged to receive. Each of the probes 900, 904, 908 further comprises a position sensor 912, 914, 916 so that the position of the probe, and hence the transducer arrays mounted on it, can be monitored. The system can then operate in the same way as the systems described above except that the calibration step 300 used to spatially align the PAM image with the anatomical ultrasound image is replaced by a transformation which varies with time and is determined for each image frame of the PAM image stream based on the relative positions of the two probes 900, 908.

In a further embodiment, the system comprises a FUS ultrasound transmitter mounted on a probe or a robot arm, and a movable probe which has the PAM imaging receive transducer elements and both the transmit and receive elements of the anatomical ultrasound imaging system on it, either as separate arrays or as a single common array, or as a transmit array for the anatomical ultrasound imaging and a receive array for both the PAM imaging and the anatomical ultrasound imaging.

The invention claimed is:

1. A system for imaging cavitation in a subject volume of a subject, the system comprising:
a plurality of transducer elements;
a control unit controlling at least a first one of the transducer elements to generate ultrasound having a focal region;
wherein the control unit receives passive detection signals from a first group of the transducer elements and generates from the passive detection signals a cavitation image of cavitation in the focal region;
wherein the control unit controls at least a second one of the transducer elements to generate reflective imaging ultrasound;
wherein the control unit receives reflective imaging detection signals from a second group of the transducer elements and generates from the reflective imaging detection signals a reflective image;
wherein the control unit receives a 3D image that includes the subject volume, the 3D image having a 3D coordinate system and being generated by a scanner external to the system;
wherein the control unit registers the reflective image with the 3D image of the subject volume to obtain a transformation between a coordinate system of the first group of the transducer elements and the 3D coordinate system of the 3D image; and
wherein the control unit applies the transformation to the cavitation image to align the cavitation image with the 3D image.

2. The system according to claim 1 wherein the first group of the transducer elements are in a fixed position relative to the second group of the transducer elements.

3. The system according to claim 1 further comprising a probe, wherein the first group of the transducer elements and the second group of the transducer elements are mounted on the probe.

4. The system according to claim 1 wherein the first group of the transducer elements comprises at least one of: a straight linear array of the transducer elements and a convex linear array of the transducer elements.

5. The system according to claim 1 wherein the second group of the transducer elements comprises at least one of: a straight linear array of the transducer elements and a convex linear array of the transducer elements.

6. The system according to claim 1 wherein at least one of the transducer elements of the first group of the transducer elements is one of the transducer elements of the second group of the transducer elements.

7. The system according to claim 6 wherein the first group of the transducer elements is also the second group of the transducer elements.

8. The system according to claim 7 wherein the ultrasound having a focal region has a first range of frequencies, and the passive detection signals have a second range of frequencies, the second range of frequencies excluding the first range of frequencies.

9. A method of imaging cavitation in a subject volume of a subject, the method comprising the steps of:
- generating focused ultrasound having a focal region;
- receiving passive detection signals from a first group of transducer elements and generating from the passive detection signals a cavitation image of cavitation in the focal region;
- generating reflective imaging ultrasound;
- receiving reflective imaging detection signals from a second group of transducer elements and generating from the reflective imaging detection signals a reflective image;
- providing a 3D image of the subject volume, the 3D image having a 3D coordinate system and being generated by a scanner external to the system;
- registering the reflective image with the 3D image of the subject volume to obtain a transformation between a coordinate system of the first group of transducer elements and the 3D coordinate system of the 3D image; and
- applying the transformation to the cavitation image to align the cavitation image with the 3D image.

* * * * *